(12) United States Patent
Saito et al.

(10) Patent No.: US 6,684,848 B2
(45) Date of Patent: Feb. 3, 2004

(54) DIRECT-INJECTION SPARK-IGNITION ENGINE

(75) Inventors: Fumihiko Saito, Aki-gun (JP); Noriyuki Ohta, Aki-gun (JP); Hiroyuki Yamashita, Aki-gun (JP); Masashi Marubara, Aki-gun (JP); Masatoshi Seto, Aki-gun (JP); Hiroyuki Yoshida, Aki-gun (JP); Takehiko Yasuoka, Tokyo (JP); Masakazu Matsumoto, Kitakyushu (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 10/106,843

(22) Filed: Mar. 27, 2002

(65) Prior Publication Data

US 2002/0170531 A1 Nov. 21, 2002

(30) Foreign Application Priority Data

Mar. 30, 2001 (JP) .......................... 2001-99220

(51) Int. Cl.⁷ ............................ F02B 17/00; F02B 23/10
(52) U.S. Cl. ...................... 123/295; 123/301; 123/305
(58) Field of Search ................. 123/295, 301, 123/305, 193.6, 276, 279, 298, 302, 308

(56) References Cited

U.S. PATENT DOCUMENTS

| 5,913,297 A | * | 6/1999 | Jingu ......................... 123/295 |
| 6,138,639 A | | 10/2000 | Hiraya et al. ............... 123/295 |
| 6,173,690 B1 | * | 1/2001 | Iriya et al. .................. 123/295 |
| 6,311,665 B1 | * | 11/2001 | Yasuoka et al. ............ 123/260 |

FOREIGN PATENT DOCUMENTS

| DE | 199 28 108 A1 | 12/2000 |
| EP | 0 916 824 A1 | 5/1999 |
| EP | 1 069 291 | 1/2001 |
| JP | 2000-120440 | 4/2000 |
| JP | 2001-271650 | 10/2001 |
| WO | WO 00/08318 | 2/2000 |
| WO | WO 01/73277 | 10/2001 |

OTHER PUBLICATIONS

Patent Abstracts of Japan vol. 018, No. 090 (M–1560), Feb. 15, 1994, & JP 05 296048 A (Toyota Motor Corp), Nov. 9, 1993 *Abstract*.

European Search Report (Dated Apr. 25, 2003).

* cited by examiner

*Primary Examiner*—Hieu T. Vo
*Assistant Examiner*—Johnny H. Hoang
(74) *Attorney, Agent, or Firm*—Nixon Peabody LLP; Donald R. Studebaker

(57) ABSTRACT

A fuel spray and a tumble collide with each other from approximately opposite directions in a cavity formed in a piston head so that a combustible mixture stays around a spark plug for an extended period of time. An upper opening of the cavity is elongated to both the left and right sides of a cylinder axis. The distance between a ceiling of the combustion chamber and a bottom surface of the cavity is smaller on the right side of the cylinder axis than on the left side thereof and largest at least at a point where the cylinder axis crosses the bottom surface of the cavity, and a portion of the cavity to the left of the cylinder axis has a larger volumetric capacity than a portion of the cavity to the right of the cylinder axis, whereby a strong tumble is maintained up to a fuel injection point.

9 Claims, 12 Drawing Sheets

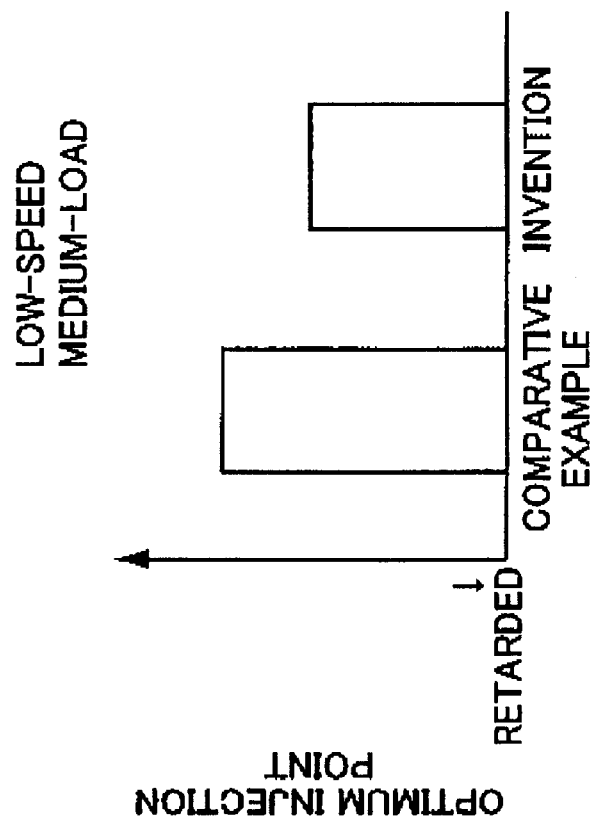
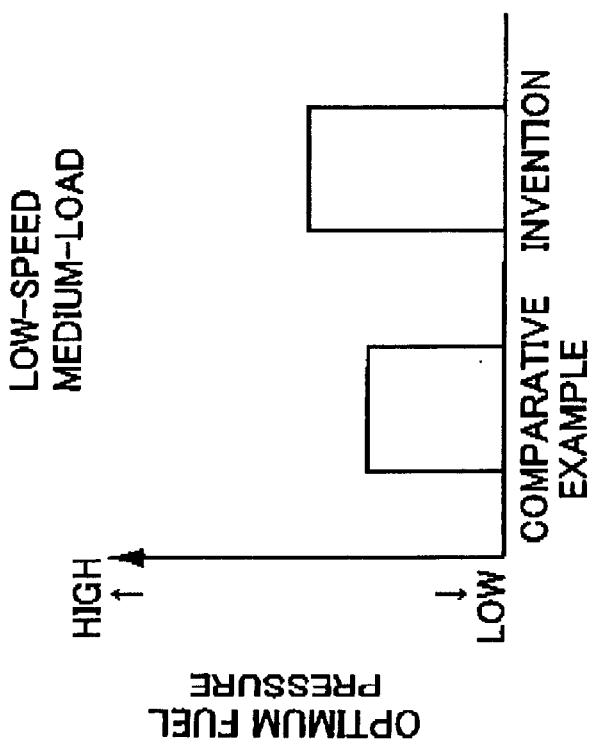

PRIOR ART

DIRECT-INJECTION SPARK-IGNITION ENGINE

BACKGROUND OF THE INVENTION AND RELATED ART STATEMENT

1. Field of the Invention

The present invention relates to a direct-injection spark-ignition engine having an injector for injecting fuel directly into a combustion chamber. More particularly, the invention pertains to the construction of a direct-injection spark-ignition engine in which a stratified combustible mixture is produced around a spark plug using a tumble during operation by stratified charge combustion.

2. Description of the Related Art

In one example of a conventionally known direct-injection spark-ignition engine which is provided with an injector for injecting fuel directly into a combustion chamber, the air-fuel ratio is increased to produce a lean mixture and the injector injects the fuel during every compression stroke such that the mixture is locally distributed around a spark plug to cause stratified charge combustion in a low-speed low-load operating range, thereby achieving an improvement in fuel economy. For this kind of engines, various approaches to accelerating mixture strification have been proposed heretofore involving a variety of piston head shapes.

As an example, there is formed a deep recess, or a cavity, in the top surface of a piston at a location offset from the axis of a cylinder. An injector injects the fuel toward this cavity, producing a controlled mist of fuel which moves toward an area surrounding a spark plug after hitting against the surface of the cavity.

Another example of a conventional direct-injection spark-ignition engine is disclosed in Japanese Unexamined Patent Publication No. 2000-120440, in which an intake line is so constructed as to produce a tumble in a combustion chamber and a cavity having an ω-shaped cross section is formed in the top surface of a piston. The ω-shaped cavity is formed of an arc-shaped recess cut in an area of the piston head close to an intake valve and another arc-shaped recess cut in an area of the piston head close to an exhaust valve, the two arc-shaped recesses being located adjacent to each other, forming a central ridge in between. In this engine, an injector provided in a peripheral wall of the combustion chamber injects fuel toward the arc-shaped recess close to the intake valve and the tumble flows along the arc-shaped recess formed close to the exhaust valve. Guided along surfaces of the respective arc-shaped recesses, a fuel spray and the tumble meet at the central ridge on the piston head and are directed upward together, whereby the fuel spray joined by the tumble is brought toward a spark plug provided at a central upper part of the combustion chamber.

In the aforementioned arrangement in which the fuel is injected in the compression stroke, the surface of the cavity is situated close to the spark plug at each fuel injection point (which exists in a latter part of the compression stroke) during stratified charge combustion operation. Even after ignition, the surface of the cavity is close to the spark plug during an early stage of combustion wherein the piston is still in the proximity of its top dead center. Thus, flame propagation tends to be hindered by the cavity surface during this stage. Another problem of this approach is that the amount of hydrocarbon (HC) emissions could increase due to fuel adhesion to the cavity surface.

In the aforementioned approach of Japanese Unexamined Patent Publication No. 2000-120440 employing the piston having the co-shaped cavity in its top surface, the fuel spray and the tumble flowing along the surfaces of the arc-shaped recesses formed close to the intake and exhaust valves, respectively, are guided upward together toward the central upper part of the combustion chamber. Although this construction provides an enhanced efficiency in terms of mixture transport toward the spark plug, the mixture is carried relatively swiftly by the tumble so that the mixture passes the nearby area of the spark plug within quite a short period. For this reason, the time period during which the combustible mixture exists around the spark plug (and the mixture can be ignited by the spark plug) is extremely short and, therefore, there is provided a small degree of freedom in determining fuel injection and ignition timing. Furthermore, flame propagation tends to be hindered by the central ridge in the ω-shaped cavity during an early stage of combustion. This construction also has a problem that the injected fuel tends to adhere to the surface of the arc-shaped recess close to the intake valve.

Under these circumstances, the inventor of the present invention has introduced a new engine design for properly controlling the flow of air-fuel mixture. According to this design, an injector sprays a mist of fuel into a combustion chamber from a direction approximately opposite to the flow of tumble. As the fuel spray injected from the injector collides with the tumble, evaporation and atomization of the fuel are accelerated and the fuel spray decelerated by the tumble is mixed with air. As a result, a combustible mixture stays longer around a spark plug in the form of suspended matter.

An example of piston structure (comparative example) according to this new design is shown in FIG. 12.

Referring to FIG. 12, a spark plug 111 is provided at a central upper part of a combustion chamber 105 and an injector 112 is provided at its peripheral part. There is formed a cavity 115 in the top surface of a piston 104 so that a fuel spray and a tumble T collide with each other from approximately opposite directions within this cavity 111. More specifically, as illustrated in the cross section of FIG. 12, there are provided an intake port 107 on the left side and an exhaust port 108 on the right side in a ceiling of the combustion chamber 105, and the tumble T created in the combustion chamber 105 flows clockwise. The spark plug 111 is located at the central upper part of the combustion chamber 105 and the injector 112 at the peripheral part of the combustion chamber 105 on the left side (on the side of the intake port 107) as illustrated. The bottom of the cavity 115 formed in the top surface of the piston 104 has a smooth concave shape whose lowest point exists on or near cylinder axis Z. During the stratified charge combustion operation, the tumble T (particularly a later-described counterflow of tumble T) and the fuel spray collide with each other from approximately the opposite directions within the cavity 115 so that a combustible mixture stays around the spark plug 111 for a prolonged period.

In this structure, it is necessary that the fuel spray and the tumble T collide with almost an equal strength in approximately a central part of the cavity 115 to cause the combustible mixture to stay around the spark plug 111 for a prolonged period. It is also necessary to retard the fuel injection point (so that it approaches the ignition point) as much as possible for avoiding dispersion of fuel and to increase fuel pressure so that a required amount of fuel can be injected within a short period of time. Accordingly, it is desirable to produce a strong tumble within the cavity 115 at the point of fuel injection so that the tumble would not be much disturbed by the increased fuel pressure. With the aforementioned structure of the cavity 115 having approximately a left-right symmetric profile with respect to the cylinder axis Z (FIG. 12), however, the center of the tumble could be displaced from the cylinder axis Z and the tumble itself is likely to diminish during middle to latter parts of the compression stroke as will be explained later with reference to FIGS. 13A–13C and 14. Thus, there is still left some room for improvement in the structure of FIG. 12 concerning, in particular, creation of a strong tumble at the point of fuel injection.

SUMMARY OF THE INVENTION

In view of the foregoing, it is an object of the invention to provide a direct-injection spark-ignition engine which causes a mist of fuel sprayed from an injector and a tumble to collide with each other from approximately opposite directions so that a combustible mixture stays around a spark plug for a prolonged period of time during stratified charge combustion operation. It is a more specific object of the invention to provide a direct-injection spark-ignition engine capable of maintaining a sufficiently strong tumble up to every fuel injection point so that fuel is evaporated and atomized and a stratified mixture is created in a preferable fashion during stratified charge combustion operation.

According to the invention, a direct-injection spark-ignition engine having an intake air system which is so constructed as to produce a tumble in a combustion chamber whose ceiling is higher at a central part than at a peripheral part as seen in a cross section viewed from a direction from which the tumble seems to be turning clockwise comprises a spark plug and an injector provided at the central part and the peripheral part of the ceiling, respectively. In this direct-injection spark-ignition engine, the injector injects fuel into the combustion chamber in a direction opposite to a flow of the tumble to produce a stratified combustible mixture around the spark plug at an ignition point during stratified charge combustion operation, and a cavity whose upper opening is elongated to both the left and right sides of a cylinder axis is formed in the top surface of a piston, the distance between the ceiling of the combustion chamber and a bottom surface of the cavity as measured parallel to the cylinder axis being smaller on the right side of the cylinder axis than on the left side thereof and largest at least at a point where the cylinder axis crosses the bottom surface of the cavity, and a portion of the cavity to the left of the cylinder axis has a larger volumetric capacity than a portion of the cavity to the right of the cylinder axis, as seen in the aforesaid cross section.

In this construction, the injector injects the fuel during a compression stroke in such a manner that a fuel spray and the tumble collide with each other in the cavity from approximately opposite directions during the stratified charge combustion operation. This serves to accelerate atomization of the fuel and produce the stratified combustible mixture around the spark plug located at the central part of the ceiling of the combustion chamber by stratifying a mixture of the fuel spray and air. The fuel spray is decelerated by its collision with the tumble, creating a situation in which the mixture floats beneath the central part of the ceiling of the combustion chamber. As a result, compared to the aforementioned prior art arrangement of Japanese Unexamined Patent Publication No. 2000-120440 in which the mixture is simply transported by the tumble, the period of time during which the combustible mixture stays around the spark plug is extended, resulting in an increase in the degree of freedom in determining fuel injection and ignition timing. The arrangement of this invention also serves to reduce adhesion of the fuel to the cavity surface and increase the effect of improving fuel economy by mixture strification.

These and other objects, features, and advantages of the present invention will become more apparent upon reading the following detailed description along with the accompanying drawings.

BRIEF DESCRIPTION OF THE DRAWINGS

FIGS. 6A and 6B are diagrams showing respectively data on optimum fuel pressures and optimum fuel injection points in a low-speed medium-load range for the comparative example of FIG. 12 and the engine of the embodiment of FIG. 1;

DETAILED DESCRIPTION OF THE PREFERRED EMBODIMENTS OF THE INVENTION

The invention is now described, by way of example, with reference to the accompanying drawings.

Figure 1:
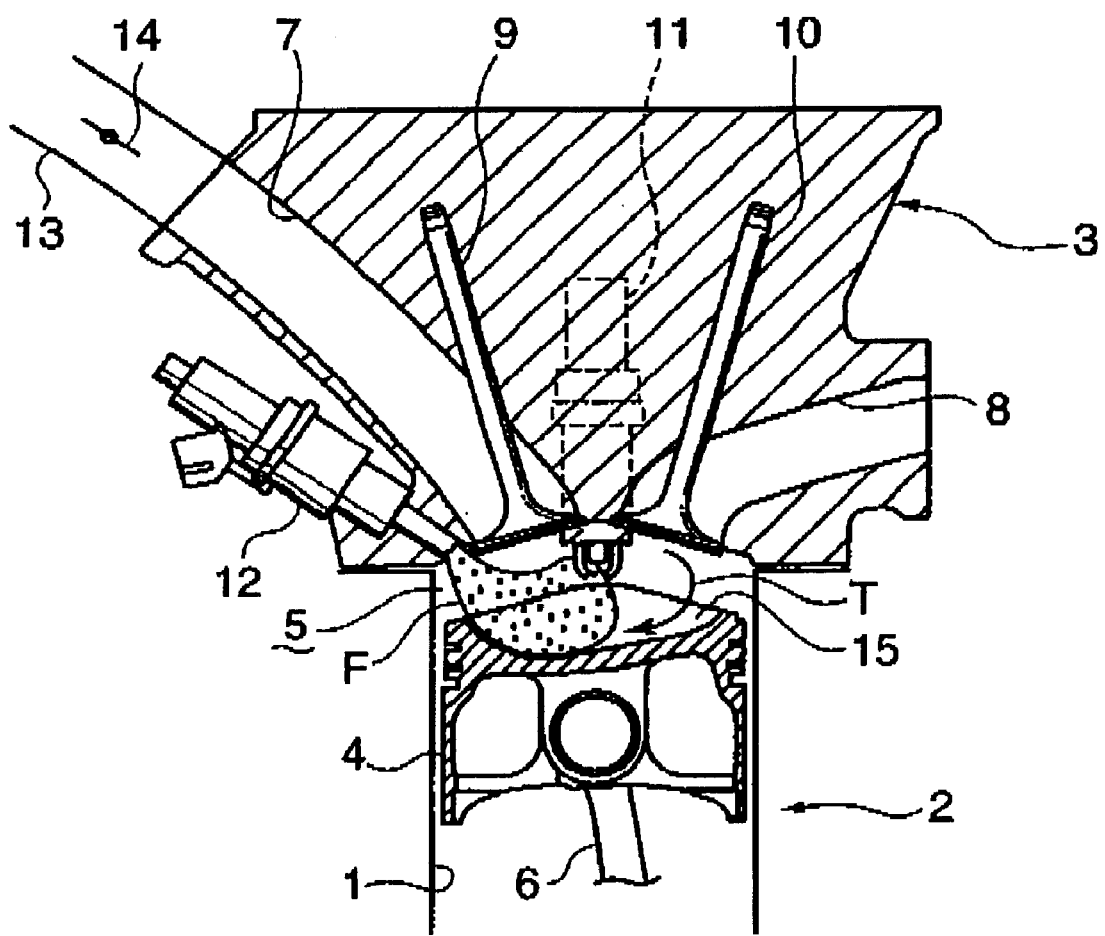
FIG. 1 is a cross-sectional view of a direct-injection spark-ignition engine according to an embodiment of the invention.

FIG. 1 is a cross-sectional view showing the construction of a principal portion of a direct-injection spark-ignition engine according to a first embodiment of the invention. As shown in this Figure, the engine comprises a cylinder block 2 in which a plurality of cylinders 1 are arranged, a cylinder head 3 mounted on top of the cylinder block 2, and a plurality of pistons 4 which are fitted in the in a manner that the pistons 4 can move up and down in the respective cylinders 1. There is formed a combustion chamber 5 in each cylinder 1 just between the piston 4 and the cylinder head 3. Each piston 4 is linked to a crankshaft (not shown) located below the cylinder block 2 via a connecting rod 6.

As can be seen from the cross-sectional view of FIG. 1, a central part of the ceiling of the combustion chamber 5 in each cylinder 1 is higher than a peripheral part. In this embodiment, the ceiling of the combustion chamber 5 has a pent-roof structure having two-sides slopes (inner surfaces) extending obliquely downward to a lower end of the cylinder head 3. There are formed two each intake ports 7 and exhaust ports 8 in the cylinder head 3 opening in the two sloped surfaces of the ceiling of the combustion chamber 5. Note that FIG. 1 shows one each intake port 7 and exhaust port 8 only for the sake of simplicity of illustration. Intake valves 9 are provided at open ends of the individual intake ports 7 while exhaust valves 10 are provided at open ends of the individual exhaust ports 8. The intake valves 9 and the exhaust valves 10 are individually caused to open and close with individually controlled timing by an unillustrated valve actuator.

A spark plug 11 is provided in a central upper area of the combustion chamber 5 as if surrounded by the four valves 9, 10 with an end of the spark plug 11 projecting downward into the combustion chamber 5 from its ceiling. In a peripheral area of the combustion chamber 5, there is provided an injector 12 as if sandwiched between the two intake ports 7. Having an injection nozzle whose spray angle is 70° or less, the injector 12 injects fuel directly into the combustion chamber 5.

Fuel injection from the injector 12 is controlled in accordance with engine operating conditions by an unillustrated control unit. The engine is controlled, for example, to make stratified charge combustion in a low-speed low-load operating range, wherein the amount of intake air and the amount of injected fuel are controlled such that the air-fuel ratio becomes larger than the stoichiometric air-fuel ratio producing a lean mixture and a fuel injection point occurs in a latter part of each compression stroke during stratified charge combustion operation.

The intake port 7 extends obliquely upward from the combustion chamber 5 and its upstream extremity connects to an intake passage 13 in which a tumble regulating valve 14 is provided. A tumble T is created in the combustion chamber 5 by a flow of intake air introduced through the intake port 7 into the combustion chamber 5 and the strength of the tumble T is adjusted according to the opening of the tumble regulating valve 14. The control unit (not shown) controls the tumble regulating valve 14 in accordance with engine operating conditions such that a strong tumble T is produced at least during the stratified charge combustion operation.

The direction of fuel sprayed from the injector 12 is controlled such that this fuel spray F and the flow of the tumble T in the combustion chamber 5 are oppositely directed. Specifically, the intake port 7 and the exhaust port 8 are located on the left side and right side of the combustion chamber 5 and the tumble T flows clockwise as shown by an arrow in the cross-sectional view of FIG. 1. With this arrangement, the injector 12 located at the left side of the combustion chamber 5 injects the fuel obliquely downward to the right (as illustrated) so that the fuel spray F hits against a later-described counterflow Tm of the tumble T.

Figure 2:
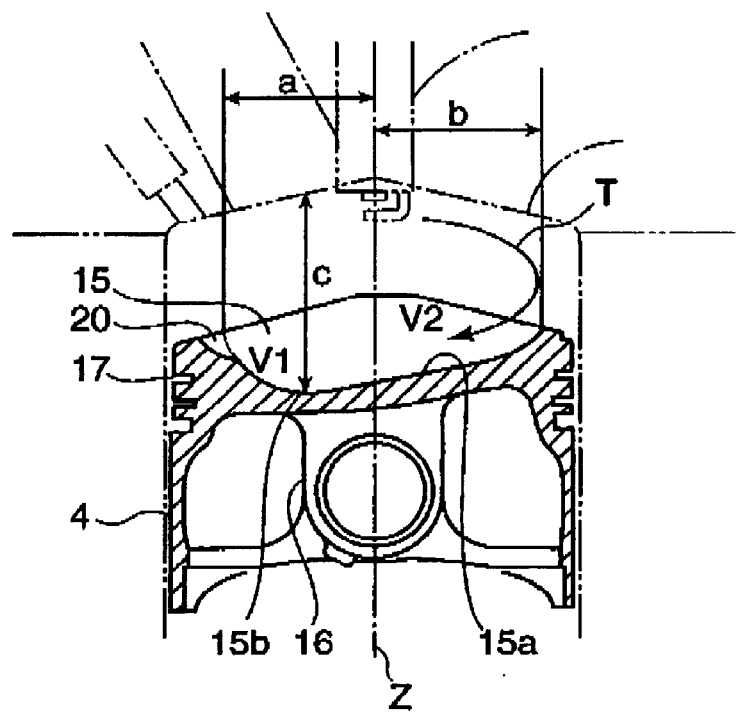
FIG. 2 is a cross-sectional view showing the shape of a piston of the engine of FIG. 1.
Figure 3:
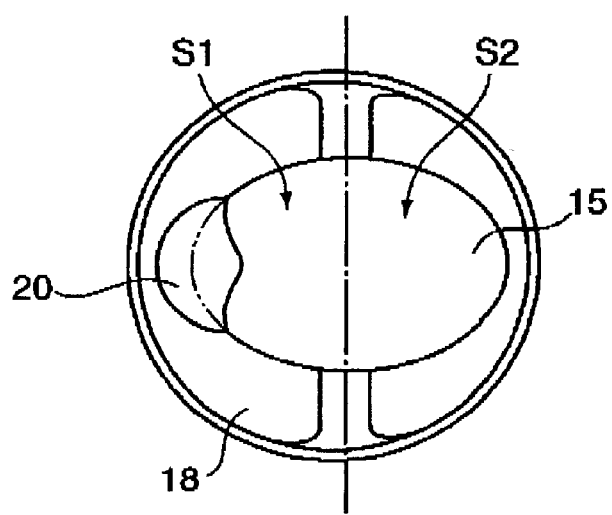
FIG. 3 is a plan view of the piston.

Referring to FIGS. 2 and 3, there is formed a cavity 15 in the top surface of the piston 4 This cavity 15 has a generally elliptical shape in top view elongate in the direction of fuel injection from the injector 12, or in the center line of the fuel spray F. Referring to FIGS. 1 and 2 showing cross sections viewed from a direction from which the tumble T seems to be turning clockwise, an upper opening of the cavity 15 extends to approximately the same extent to both the left and right of cylinder axis Z. Specifically, the distance A from the cylinder axis Z to the leftmost end of the cavity 15 is approximately equal to the distance B from the cylinder axis Z to the rightmost end of the cavity 15. A bottom surface 15a of the cavity 15 is shaped such that the distance C from the ceiling of the combustion chamber 5 to the bottom surface 15a as measured parallel to the cylinder axis Z is smaller on the left side of the cylinder axis Z than on the right side thereof and is largest at least at a point where the cylinder axis Z crosses the bottom surface 15a.

As depicted in FIGS. 2 and 3, there is formed a recess 20 at a left end portion of the cavity 15 for releasing the fuel. Alternate long and two short dashed curved lines of FIGS. 2 and 3 at the left end portion of the cavity 15 show its basic shape, that is, the shape the cavity 15 would take it the recess 20 is not provided.

Looking more closely into the shape of the bottom surface 15a with reference to the cross section of FIG. 2, the bottom surface 15a of the cavity 15 gradually rises from the left side of the cylinder axis Z to its right side. In other words, the bottom surface 15a is lowest at a point near the left end of the cavity 15, and from this lowest point 15b, the bottom surface 15a slopes gradually upward toward the right end of the cavity 15. As can be seen from FIG. 2, the bottom surface 15a slopes generally parallel to a left-hand slope of the ceiling of the combustion chamber 5 in an area from the lowest point 15b situated near the left end of the cavity 15 to about the cylinder axis Z and, therefore, the distance C from the ceiling of the combustion chamber 5 to the bottom surface 15a as measured parallel to the cylinder axis Z becomes generally maximum in this area. Also, on the right side of the cylinder axis Z, the ceiling of the combustion chamber 5 forms a rightward-descending slope whereas the bottom surface 15a of the cavity 15 forms a rightward-ascending slope and, therefore, the distance C from the ceiling of the combustion chamber 5 to the bottom surface 15a as measured parallel to the cylinder axis Z gradually decreases rightward.

To reduce the weight of the piston 4 and to decrease HC emissions, it is preferable to make the vertical size of a piston top land, or an upper portion of the piston 4 above a top ring groove 17, as small as possible insofar as the function of piston rings is not jeopardized. Also, it is necessary that a piston pin hole portion 16 of the piston 4 have a wall thickness capable of providing specific mechanical stiffness. The depth of the cavity 15 is determined in a manner that a sufficient effect of preventing weakening of the tumble T is obtained as will be described later while reducing the vertical size of the piston top land and providing the necessary wall thickness for the piston pin hole portion 16 in the aforementioned fashion. For this reason, the lowest point 15b of the cavity 15 situated close to its left end is located at a position slightly lower than the top ring groove 17.

With the above-described structure of the bottom surface 15a and the ceiling of the combustion chamber 5 illustrated in FIG. 2, a portion of the cavity 15 to the left of the cylinder axis Z is more deeply recessed than a portion of the cavity 15 to the right of the cylinder axis Z, so that the left portion of the cavity 15 has a larger volumetric capacity V1 than the right portion of the cavity 15 (volumetric capacity V2).

Also, as shown in FIG. 2, the left portion of the cavity 15 has an aperture area S1 while the right portion of the cavity 15 has an aperture area S2, wherein the aperture area S2 is larger than the aperture area S1. Although the cavity 15 has a generally elliptical shape in top view as previously stated, the left end portion of the cavity 15 is narrowed in the direction of the minor axis of the elliptical shape and, therefore, the aperture area S1 of the left portion of the cavity 15 is slightly smaller than the aperture area S2 of the right portion of the cavity 15.

A peripheral portion 18 of the top surface of the piston 4, excluding the cavity 15, are shaped to face generally parallel to the slopes of the ceiling of the combustion chamber 5. A gap formed between the ceiling of the combustion chamber 5 and the peripheral portion 18 of the top surface of the piston 4 serves as a squish area during a specific period before the top dead center (TCDC) on every compression stroke of the piston 4, e.g., during a period from a point of 40° crank angle (CA) before the top dead center (BTDC) to the TDC.

According to the present embodiment thus far described, the direct-injection spark-ignition engine is run by stratified charge combustion under specific engine operating conditions by producing a lean mixture (higher air-fuel ratio) and injecting the fuel in a latter part of the compression stroke from the injector 12.

During the stratified charge combustion operation, the tumble T is produced in the combustion chamber 5 by a flow of intake air introduced through the intake port 7 and the fuel is sprayed against the tumble T so that a stratified combustible mixture is produced around the spark plug 11. More specifically, referring to the cross sections of FIGS. 1 and 2, the tumble T flows from the left side (intake valve side) to the right side (exhaust valve side) along the surface of the ceiling of the combustion chamber 5 in its upper area, downward at the right side of the peripheral area of the combustion chamber 5, from the right side (exhaust valve side) to the left side (intake valve side) along the cavity 15 in the top surface of the piston 4, and upward (toward the ceiling of the combustion chamber 5) at the left side of the peripheral area of the combustion chamber 5.

In this specification, the aforementioned flow of the tumble T along the surface of the ceiling of the combustion chamber S is referred to as a forward flow Ts and the earlier-mentioned expression counterflow Tm is used to denote the aforementioned flow of the tumble T along the cavity 15 in the top surface of the piston 4. Using this terminology, the injector 12 sprays the fuel against the counterflow Tm of the tumble T1 so that the fuel spray F and the counterflow Tm of the tumble T collide with each other in the cavity 15 from approximately opposite directions. This serves to accelerate atomization of the fuel, and the fuel spray F decelerated by the counterflow Tm mixes well with the intake air, thereby creating a situation in which a combustible mixture floats around the spark plug 11 provided in the central part of the ceiling of the combustion chamber 5. Therefore, compared to the earlier cited prior art arrangement with reference to Japanese Unexamined Patent Publication No. 2000-120440 in which the fuel spray is carried by the flow of the tumble, the period of time during which the combustible mixture stays around the spark plug 11 (and during which the mixture can be ignited by the spark plug 11) is extended, resulting in an increase in the degree of freedom in determining fuel injection and ignition timing. The arrangement of this invention also serves to reduce fuel adhesion to the cavity surface.

In particular, the above-described structure of the cavity 15 formed in the top surface of the piston 4 serves to decrease shifting of the center Ct of the tumble T as well as weakening of the tumble T during the compression stroke. Therefore, a sufficiently strong tumble T is maintained even in the latter part of the compression stroke during which the fuel is injected and the combustible mixture is stratified in a desirable fashion.

Figure 12:
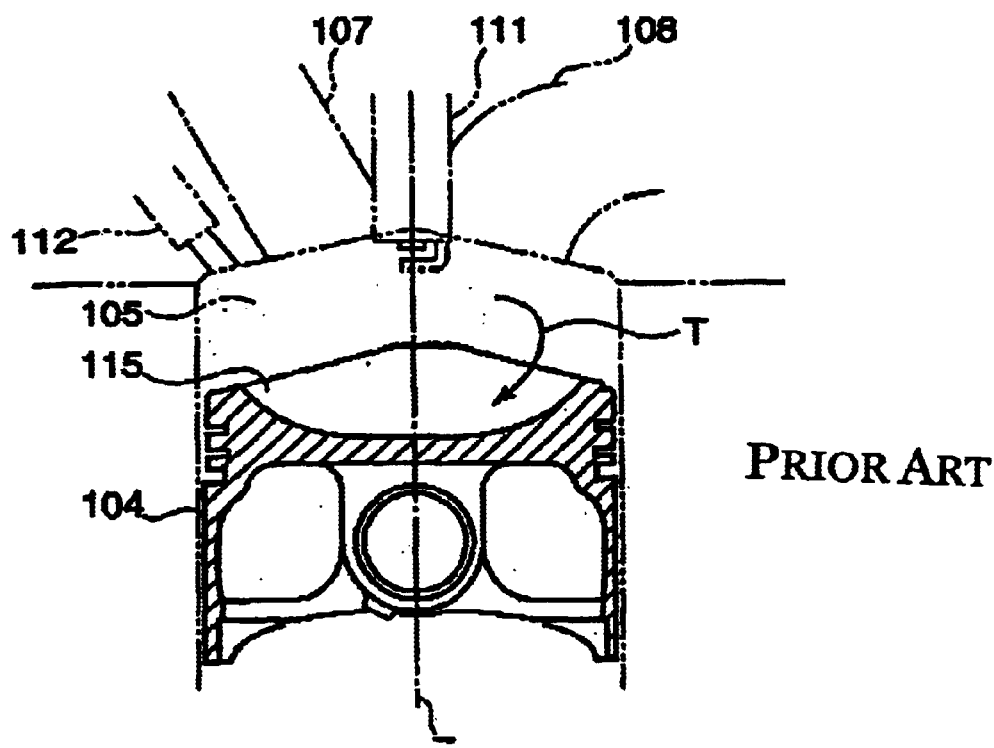
FIG. 12 is a cross-sectional diagram showing the structure of a conventional piston shown as the comparative example.
Figure 13A:
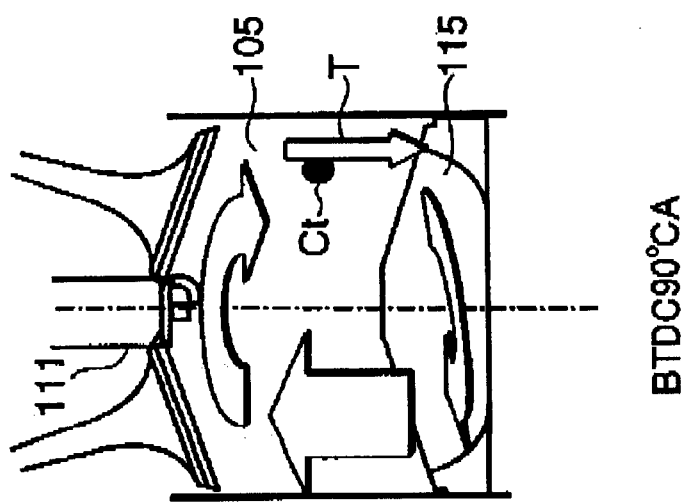
FIGS. 13A, 13B and 13C are diagrams showing tumble flows at crank angles of 130°, 110° and 90° before the top dead center on a compression stroke, respectively.
Figure 13B:
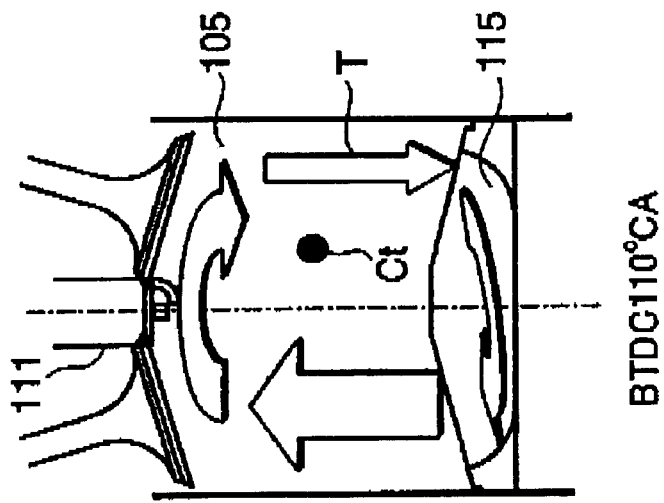
Figure 13C:
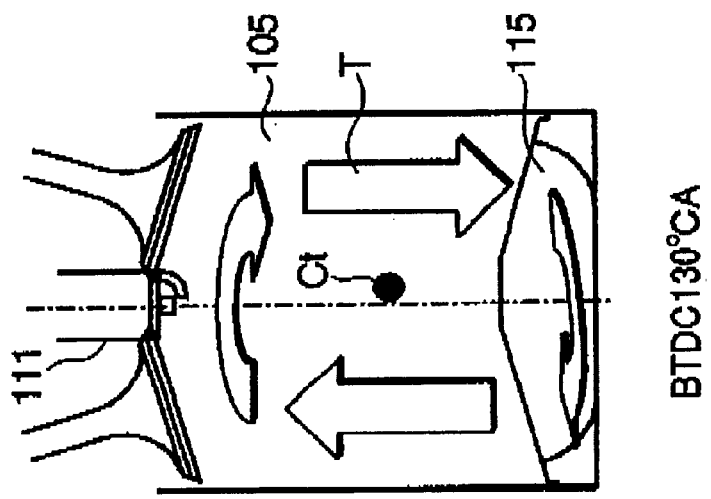

The aforementioned effect of preventing the weakening of the tumble T is explained in detail using the earlier-described conventional piston structure of FIG. 12 as a comparative example. FIGS. 13A–13C show how the flow of the tumble T varies at 130° CA BTDC, 110° CA BTDC and 90° CA BTDC on the compression stroke as the piston 104, in which the cavity 115 having the approximately left-right symmetric profile is formed as shown in FIG. 12, moves upward. In FIGS. 13A–13C, tumble flows within the combustion chamber 106 are indicated by arrows and the center Ct of the tumble T is shown by small black circles.

In the comparative example of FIG. 12, the center Ct of the tumble T is located approximately on the cylinder axis Z, and a downward tumble flow on the right side of the cylinder axis Z and an upward tumble flow on the left side of the cylinder axis Z have an approximately equal strength in an early part of the compression stroke when the piston 104 is close to the TDC as shown in FIG. 13A. As the piston 104 moves upward, the upward tumble flow on the left side becomes more intense whereas the downward tumble flow on the right side lessens as it is hindered by an ascending gas flow produced within the combustion chamber 106 due to the ascent of the piston 104. As a result, the center Ct of the tumble T gradually shifts rightward (exhaust port side) as shown in FIGS. 13B and 13C.

Figure 14:
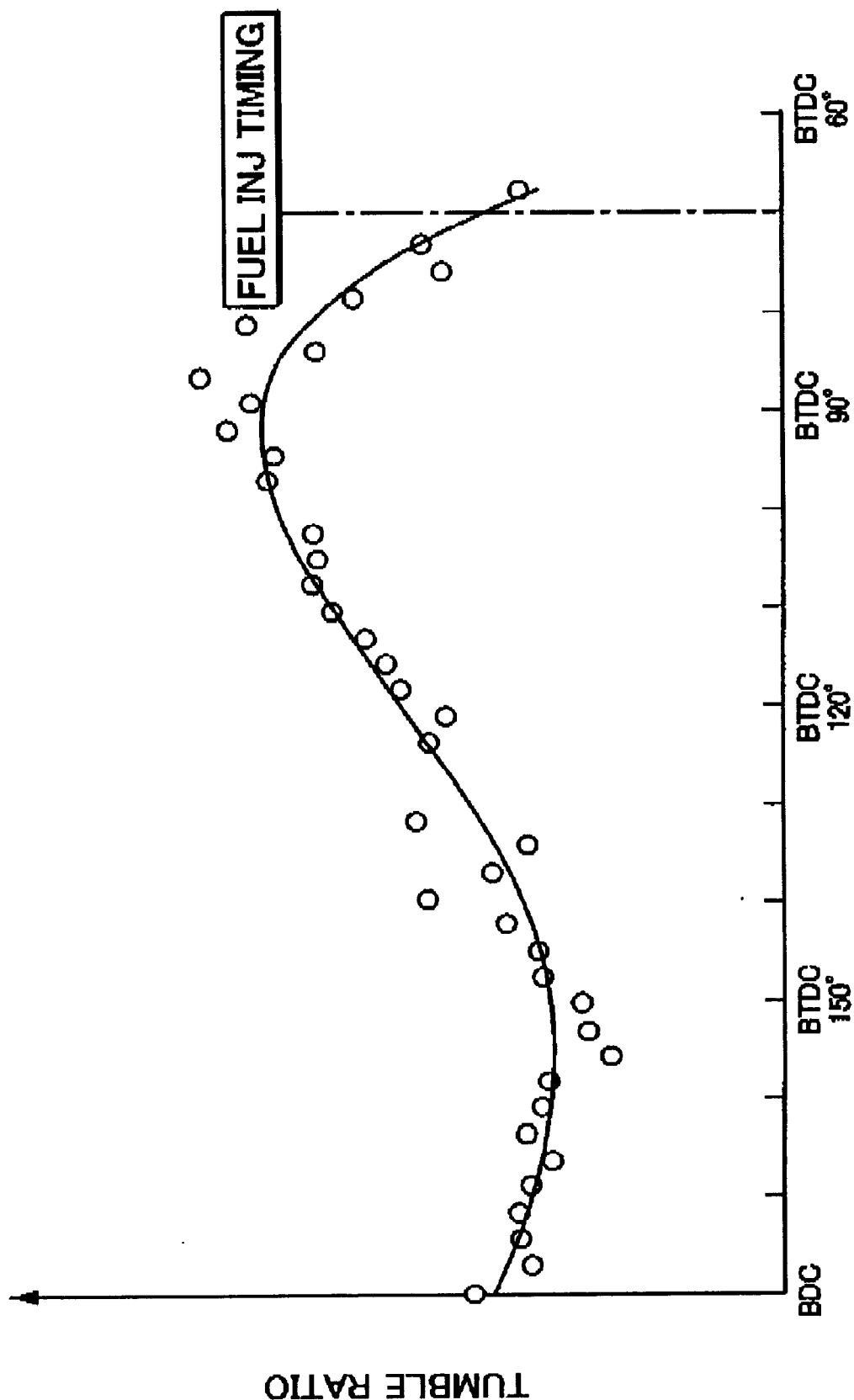
FIG. 14 is a graphical representation of varying tumble ratios achieved by the comparative example of FIG. 12 during the compression stroke.

FIG. 14 is a graphical representation of varying tumble ratios achieved by the comparative example of FIG. 12 during the compression stroke. As can be observed from FIG. 12, the tumble ratio increases from a point after the bottom dead center (BDC) up to a point halfway on the compression stroke (approximately 90° BTDC) and, from this halfway point on the compression stroke, the tumble ratio decreases because the downward tumble flow on the right side of the cylinder axis Z and a flow directed from right to left in a lower part of the combustion chamber 105 shown in FIGS. 13A–13C are significantly hindered. Consequently, the tumble ratio is remarkably reduced, which means that the tumble T is considerably weakened, by the fuel injection point.

In comparison with the prior art cavity design of FIG. 12, the bottom surface 15a of the cavity 15 of this embodiment has its lowest point 15b close to the left end of the cavity 15 and slopes gradually upward from this lowest point 15b up to the proximity of the right end of the cavity 15 as shown in the cross sections of FIGS. 1 and 2. With this cavity structure of the invention, the distance C from the ceiling of the combustion chamber 5 to the bottom surface 15a of the cavity 15 is smaller on the right side of the cylinder axis Z than at and on the left side of the cylinder axis Z. Therefore, when an ascending gas flow occurs during the compression stroke due to the ascent of the piston 4, the flow of the tumble T directed downward from the upper area of the combustion chamber 5 toward the top surface of the piston 4 at the right side of the combustion chamber 5 can easily escape leftward in the cavity 15.

As previously mentioned, the volumetric capacity V1 of the left portion of the cavity 15 is larger than the volumetric capacity V2 of the right portion of the cavity 15 whereas the aperture area S2 of the right portion of the cavity 15 is larger than the aperture area S1 of the left portion of the cavity 15 as shown in the top view of FIG. 2 in this embodiment. With this cavity structure, the cavity 15 in the piston 4 provides a sufficient area for introducing the tumble T and permits smooth flow of the tumble T from right to left along the bottom surface 15a.

Figure 4A:
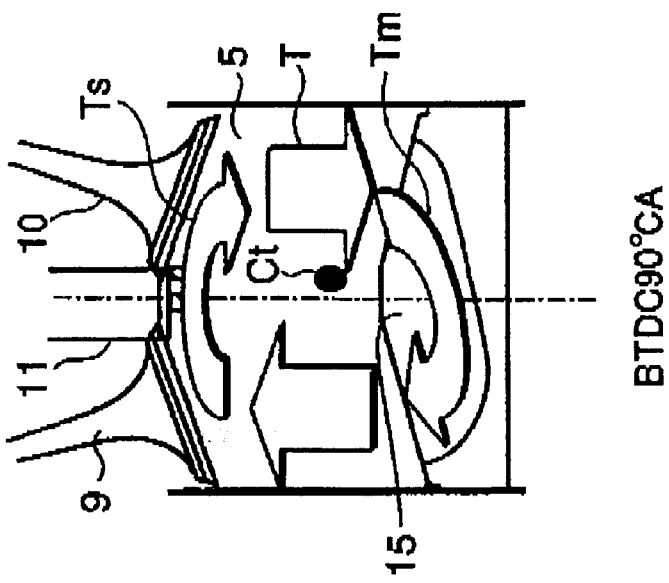
FIGS. 4A, 4B and 4C are diagrams showing tumble flows at crank angles of 130°, 110° and 90° before the top dead center on a compression stroke of the piston of the engine according to the embodiment, respectively.
Figure 4B:
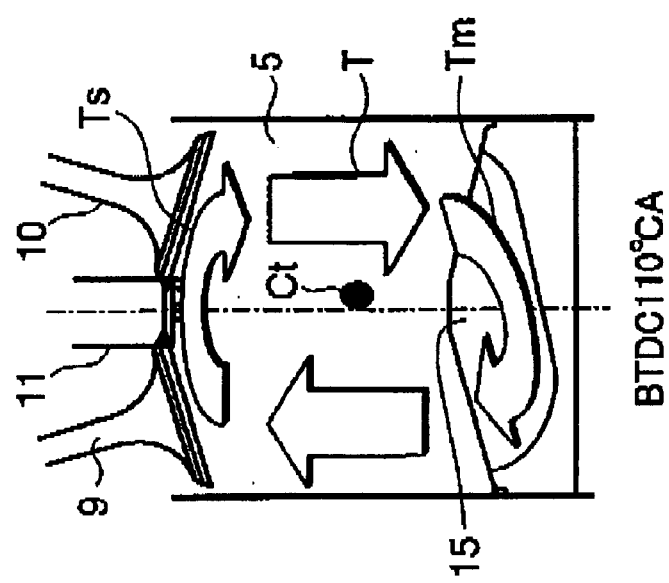
Figure 4C:
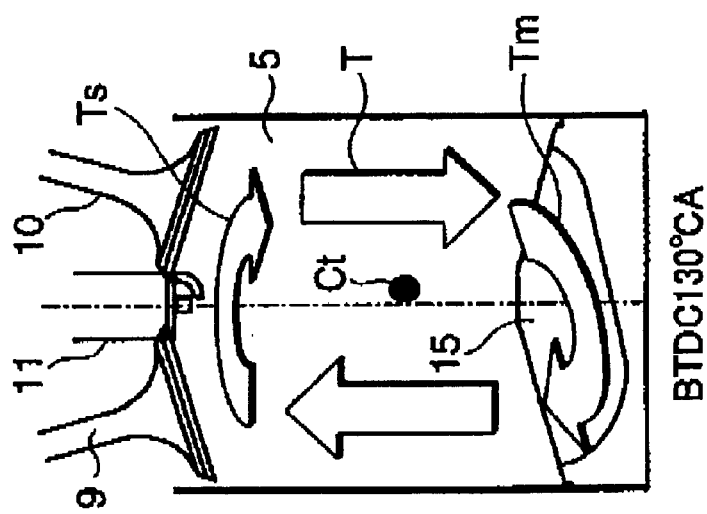

Due to the aforementioned effects, it is possible to prevent weakening of the downward flow of the tumble T from the upper area of the combustion chamber 5 toward the top surface of the piston 4 at the right side as well as of its downstream flow directed from right to left (or counterflow Tm) inside the cavity 15 and to decrease the amount of rightward shifting of the center Ct of the tumble T toward the peripheral area of the combustion chamber 5 during the progress of the compression stroke through the points of 130° CA BTDC, 110° CA BTDC and 90° CA BTDC as shown in FIGS. 4A–4C.

Therefore, the tumble T whose center Ct is located approximately at a central part of the combustion chamber 5 is maintained even at the fuel injection point. As the center Ct of the tumble T is kept approximately at the central part of the combustion chamber 5 in this fashion, it is possible to prevent the point of collision between the fuel spray F and the tumble T from shifting toward the peripheral area of the combustion chamber 5 and to keep a strong flow of the tumble T, which makes it necessary to produce a correspondingly high fuel pressure to overcome the intensified tumble T. Since the fuel is injected with an increased pressure to meet this requirement, the fuel spray F and the tumble T collide with each other with great forces, thereby accelerating atomization of the fuel and creating a situation in which a combustible mixture floats around the spark plug 11 in a preferable fashion.

Furthermore, as the time required for injecting a necessary amount of fuel is shortened due to the above-stated increase in fuel pressure, it is possible to retard the fuel injection point, and this retardation of the fuel injection point is advantageous for preventing dispersion of the fuel and for strification of the mixture.

The aforementioned effects of the invention is described in further detail with reference to FIGS. 5A–5B, 6A–6B, 7A–7B, 8A–8B, 9A–9B and 10A–10B.

FIGS. 5A–5B through 8A–8B show experimental data on optimum fuel pressures and optimum fuel injection points obtained with the piston 104 of the comparative example having the cavity 115 as depicted in FIG. 12 and the piston 4 having the cavity 15 as depicted in FIGS. 1–3 in various engine operating ranges in a stratified charge combustion region. Specifically, shown in FIGS. 5A, 6A, 7A and 8A are data on the optimum fuel pressures for the comparative example in a low-speed low-load range (approximately 1500 rpm, BMEP≈1.0 kg/cm$^2$), a low-speed medium-load range (approximately 1500 rpm, BMEP≈2.5 kg/cm$^2$), a medium-speed low-load range (approximately 2500 rpm, BMEP≈1.0 kg/cm$^2$), and a medium-speed medium-load range (which is rather close to a high-speed high-load range within the stratified charge combustion region with approximately 2500 rpm, BMEP≈4.5 kg/cm$^2$), respectively. Also, shown in FIGS. 5B, 6B, 7B and 8B are data on the optimum fuel injection points for the engine of this embodiment as it is operated in the same operating ranges. It is to be noted here that the aforementioned optimum fuel pressures and optimum fuel injection points are fuel pressures and fuel injection points most desirable for achieving optimum fuel economy when the fuel is burnt in the respective operating ranges.

As shown in these Figures, the optimum fuel pressures for the engine of the embodiment are higher than those for the comparative example and the optimum fuel injection points for the engine of the embodiment are retarded in the individual operating ranges.

Figure 5A:
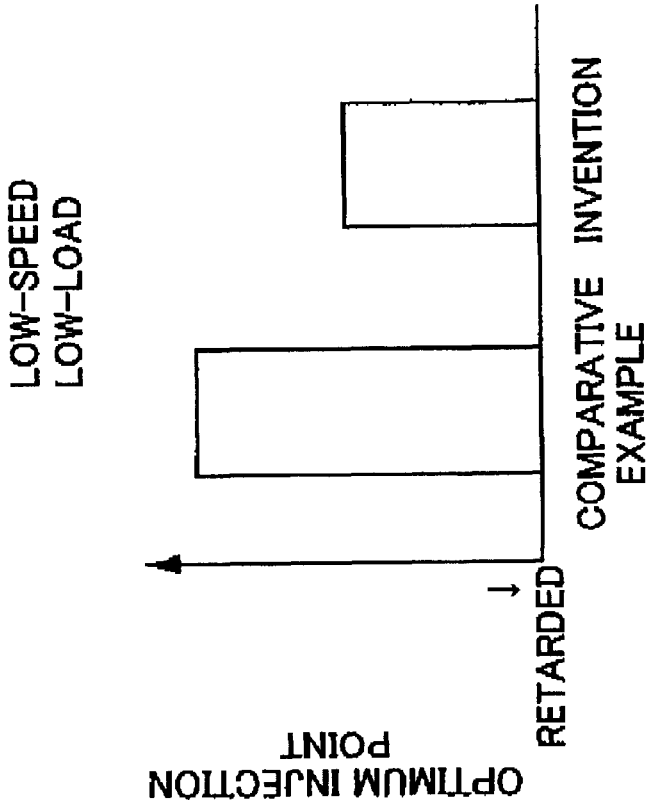
FIGS. 5A and 5B are diagrams showing respectively data on optimum fuel pressures and optimum fuel injection points in a low-speed low-load range for a comparative example of FIG. 12 and the engine of the embodiment of FIG. 1.
Figure 9B:
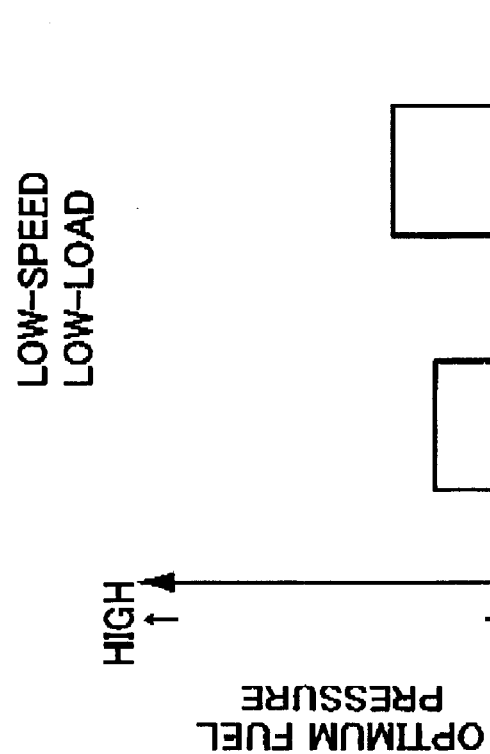
FIGS. 9A and 9B are diagrams showing data on optimum fuel pressures and optimum fuel injection points obtained at two different tumble ratios with the comparative example of FIG. 12 in the low-speed low-load range.
Figure 9A:
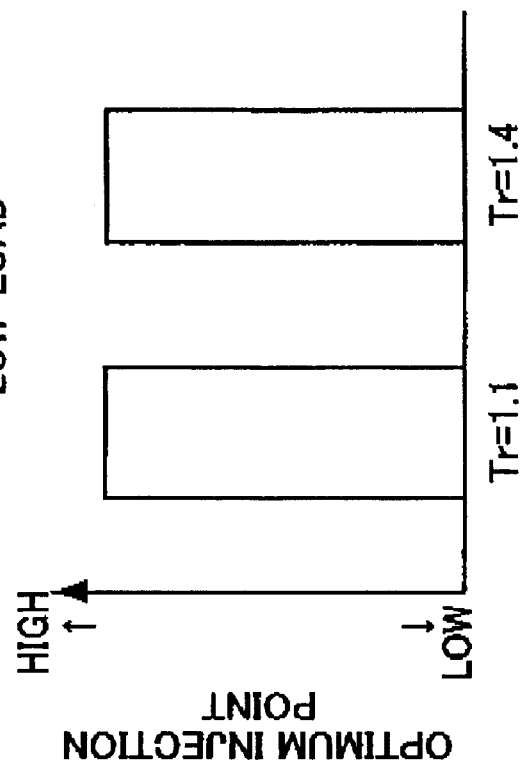
Figure 10B:
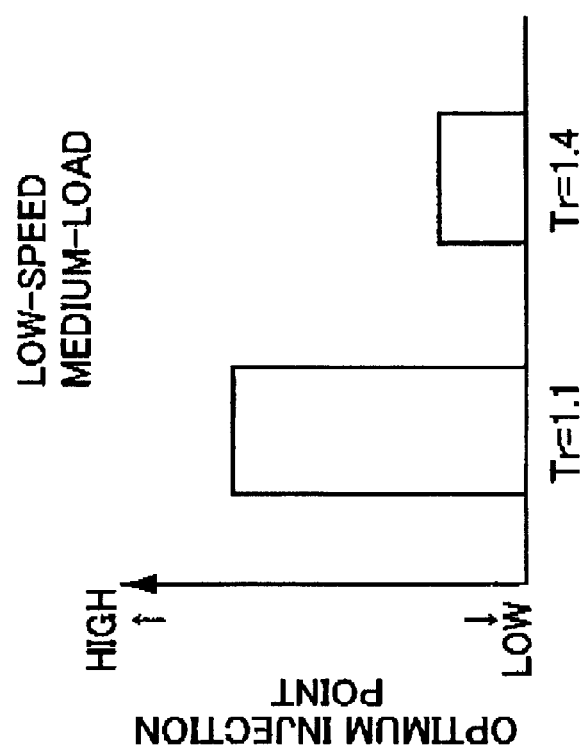
FIGS. 10A and 10B are diagrams showing data on optimum fuel pressures and optimum fuel injection points obtained at the two different tumble ratios with the comparative example of FIG. 12 in the low-speed medium-load range.
Figure 10A:
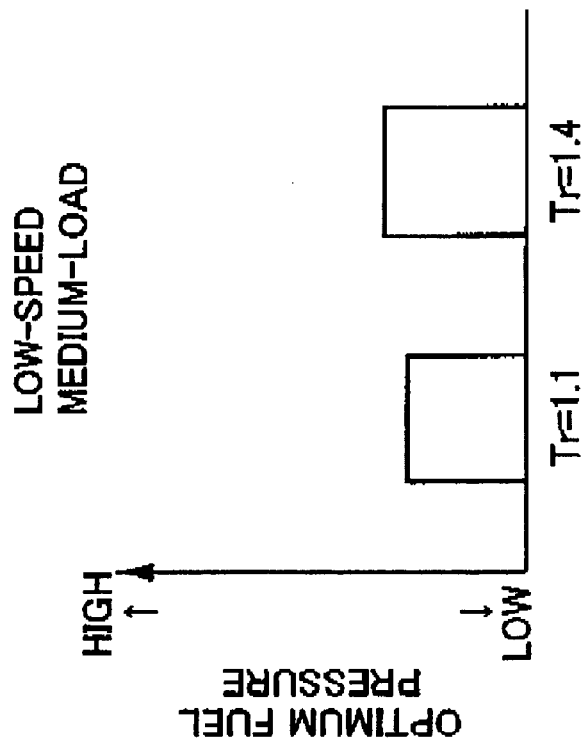

FIGS. 9A–9B and 10A–10B show experimental data on optimum fuel pressures and optimum fuel injection points obtained at two different tumble ratios Tr set by adjusting a tumble regulating valve, for example, using the piston 104 of the comparative example of FIG. 12. Specifically, FIGS. 5A and 10A show data on the optimum fuel pressures in the low-speed low-load range and the low-speed medium-load range, respectively, while FIGS. 9B and 10B show data on the optimum fuel injection points in the respective operating ranges. As can be seen from these data, the optimum fuel pressure increases and the optimum fuel injection point is retarded as the tumble ratio Tr is increased.

Figure 5B:
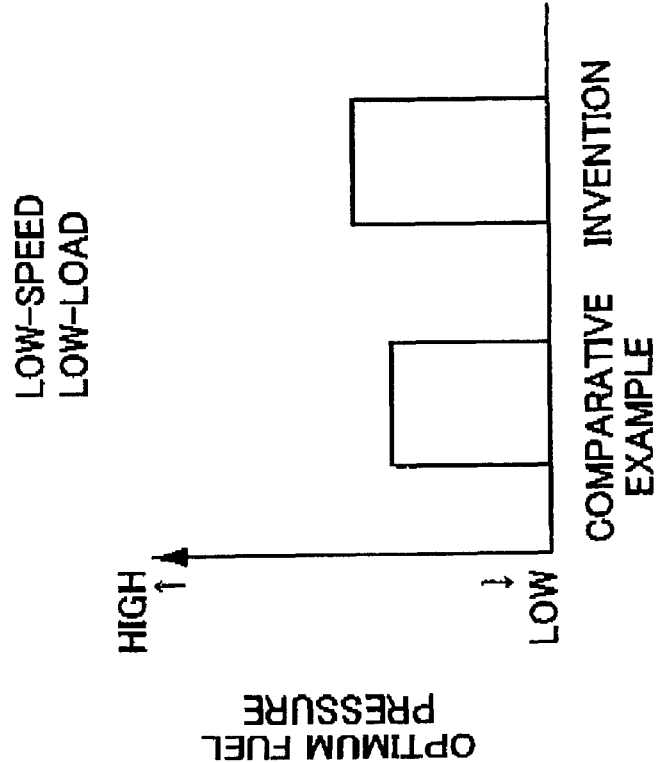
Figure 7B:
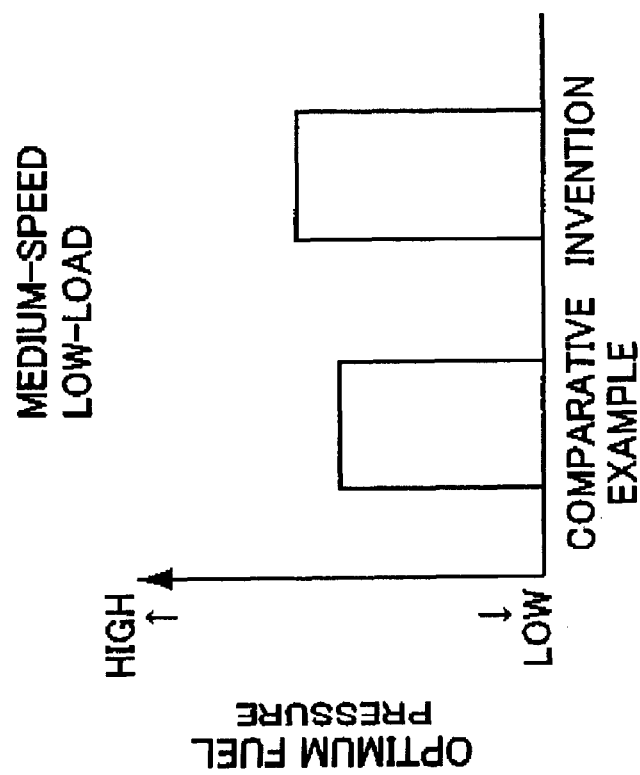
FIGS. 7A and 7B are diagrams showing respectively data on optimum fuel pressures and optimum fuel injection points in a medium-speed low-load range for the comparative example of FIG. 12 and the engine of the embodiment of FIG. 1.
Figure 7A:
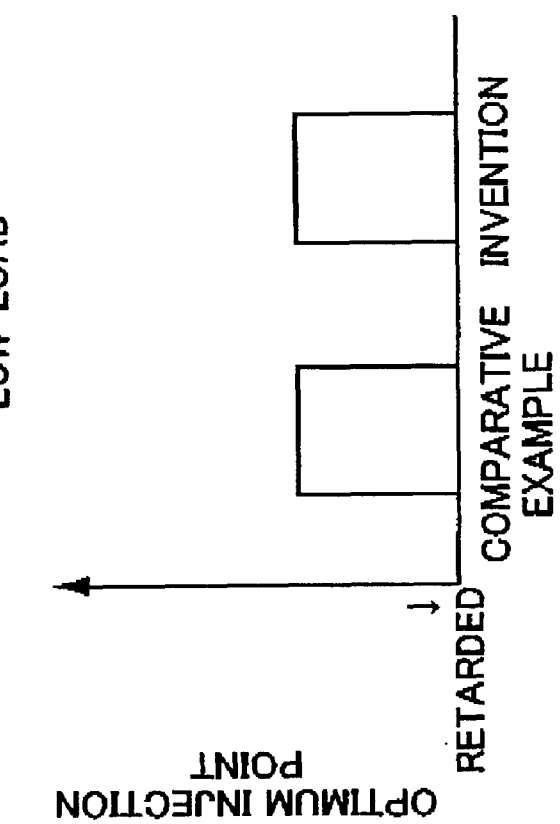
Figure 8B:
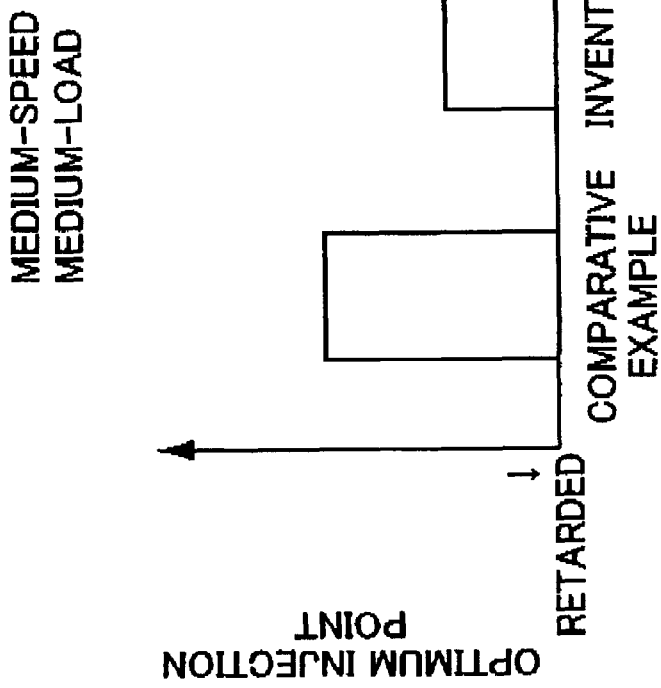
FIGS. 8A and 8B are diagrams showing respectively data on optimum fuel pressures and optimum fuel injection points in a medium-speed medium-load range for the comparative example of FIG. 12 and the engine of the embodiment of FIG. 1.
Figure 8A:
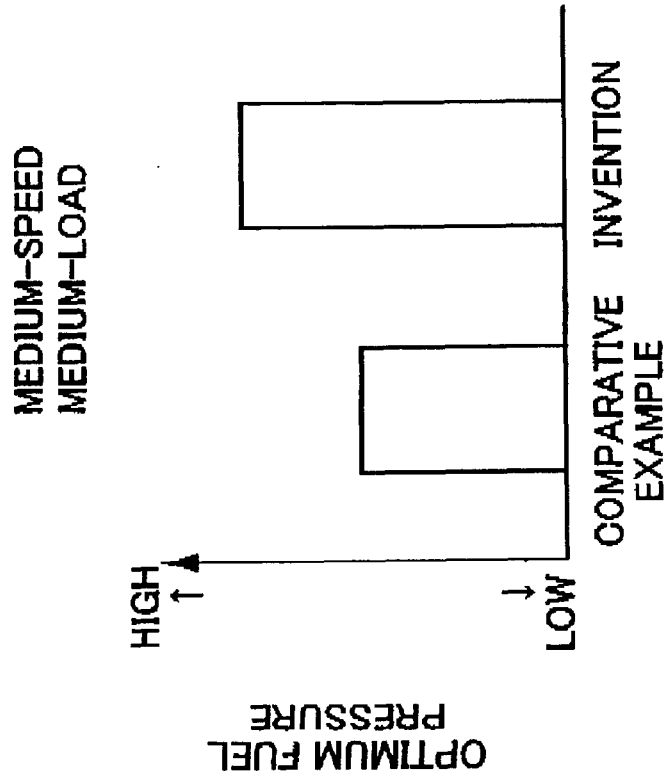

As is apparent from a comparison of the data of FIGS. 9A–9B and 10A–10B with the data of FIGS. 5A–5B through 5A–5B, the embodiment of this invention exhibits the same effect as would be observed when the tumble ratio Tr is increased in the comparative example, and this indicates that the structure of the embodiment serves to prevent the weakening of the tumble T in the compression stroke. As the weakening of the tumble T in the compression stroke is avoided in this manner, the fuel injection point is retarded when the optimum fuel pressure increases. This serves to accelerate atomization of the fuel as stated earlier and enhance the effect of mixture strification.

It is to be recognized that the invention is not limited to the above-described structure of the direct-injection spark-ignition engine but may be practiced in a variety of modified forms.

Figure 11:
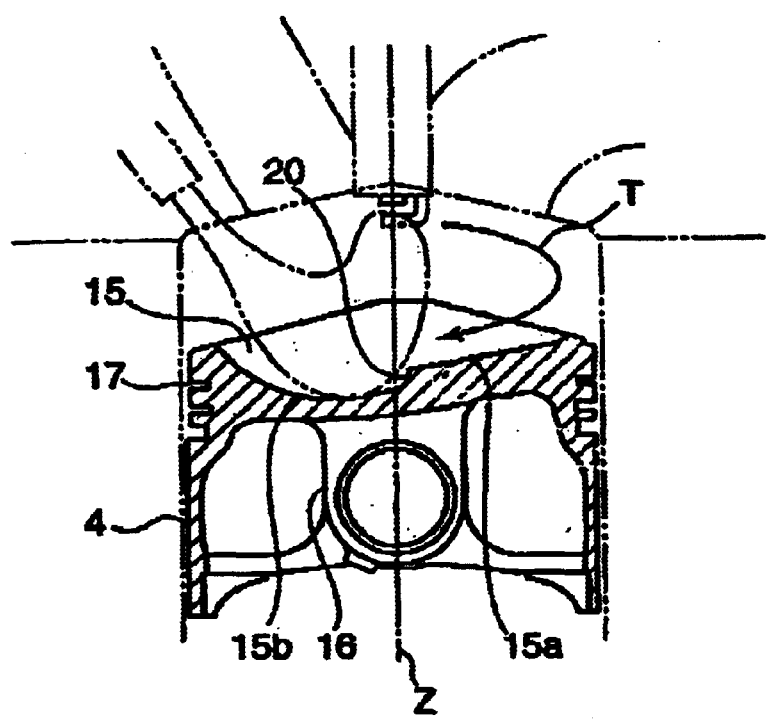
FIG. 11 is a cross-sectional diagram showing the structure of a piston according to another embodiment of the invention.

While the bottom surface 15a of the cavity 15 formed in the top surface of the piston 4 forms a smooth rightward-ascending slope extending from the lowest point 15b near the left end of the cavity 15 up to the proximity of the right end of the cavity 15 in the foregoing embodiment as shown in the cross sections of FIGS. 1 and 2, there may be formed an elevation step 20 on the slope of the cavity 15 as shown in FIG. 11.

A piston of a direct-injection spark-ignition engine according to a second embodiment also has a cavity 15 formed in the piston head as illustrated. As viewed from a direction from which a tumble T seems to be turning clockwise, the bottom surface 15a of this cavity 15 is lowest at a point near the left end of the cavity 15 and from this lowest point 15b the bottom surface 15a slopes gradually upward toward the right end of the cavity 15, except that the bottom surface 15a abruptly rises in a steplike fashion at a specific position, where the aforementioned elevation step 20 is provided, midway along the sloping bottom surface 15a. A portion of the bottom surface 15a on the left side of the elevation step 20 is generally parallel to a portion of the bottom surface 15a on the right side of the elevation step 20, the right portion of the bottom surface 15a being higher than the left portion.

The engine of this embodiment has otherwise the same construction as the engine of the earlier-described first embodiment.

When the engine is run by stratified charge combustion with the fuel injected during the compression stroke from the injector 12, a sufficiently strong tumble T is maintained at the fuel injection point as the weakening of the tumble T during the compression stroke is decreased, and a fuel spray and a counterflow Tm of the tumble T collide with each other within the cavity 15 formed in the piston head from approximately opposite directions, thereby creating a situation in which a combustible mixture stays around the spark plug 11 for a prolonged period of time. While these effects are the same as obtained in the first embodiment, what is characteristic of the second embodiment is that the counterflow Tm of the tumble T collides with a portion of the fuel spray slightly higher than the lowest part of the fuel spray. As a result, the combustible mixture can move upward more easily.

The aforementioned structure of the cavity 15 of the second embodiment is advantageous especially when the distance between the spark plug 11 and the bottom surface 15a of the cavity 15 is large.

It is not desirable to increase the amount of projection of the spark plug 11 from the ceiling of the combustion chamber 5 into its internal space too much from the viewpoint of reliability. The distance between the spark plug 11 and the bottom surface 15a of the cavity 15 increases when the angle of inclination of the pent-roof type ceiling of the combustion chamber 5 is increased to provide a large aperture area of the intake ports 7, for example. When applied to such cases, the structure of the cavity 15 of this embodiment can cause the combustible mixture to rise in approximately a central part of the combustion chamber 5 and stay around the spark plug 11 for a prolonged period of time.

In summary, the present invention relates to a direct-injection spark-ignition engine having an intake air system which is so constructed as to produce a tumble in a combustion chamber whose ceiling is higher at a central part than at a peripheral part as seen in a cross section viewed from a direction from which the tumble seems to be turning clockwise comprises a spark plug and an injector provided at the central part and the peripheral part of the ceiling, respectively. In this direct-injection spark-ignition engine, the injector injects fuel into the combustion chamber in a direction opposite to a flow of the tumble to produce a stratified combustible mixture around the spark plug at an ignition point during stratified charge combustion operation, and a cavity whose upper opening is elongated to both the left and right sides of a cylinder axis is formed in the top surface of a piston, the distance between the ceiling of the combustion chamber and a bottom surface of the cavity as measured parallel to the cylinder axis being smaller on the right side of the cylinder axis than on the left side thereof and largest at least at a point where the cylinder axis crosses the bottom surface of the cavity, and a portion of the cavity to the left of the cylinder axis has a larger volumetric capacity than a portion of the cavity to the right of the cylinder axis, as seen in the aforesaid cross section.

In this construction, the injector injects the fuel during a compression stroke in such a manner that a fuel spray and the tumble collide with each other in the cavity from approximately opposite directions during the stratified charge combustion operation. This serves to accelerate atomization of the fuel and produce the stratified combustible mixture around the spark plug located at the central part of the ceiling of the combustion chamber by stratifying a mixture of the fuel spray and air. The fuel spray is decelerated by its collision with the tumble, creating a situation in which the mixture floats beneath the central part of the ceiling of the combustion chamber. As a result, compared to the aforementioned prior art arrangement of Japanese Unexamined Patent Publication No. 2000-120440 in which the mixture is simply transported by the tumble, the period of time during which the combustible mixture stays around the spark plug is extended, resulting in an increase in the degree of freedom in determining fuel injection and ignition timing. The arrangement of this invention also serves to reduce adhesion of the fuel to the cavity surface and increase the effect of improving fuel economy by mixture strification.

In particular, since the cavity is shaped such that the distance between the ceiling of the combustion chamber and the bottom surface of the cavity as measured parallel to the cylinder axis is large at and on the left side of the cylinder axis and small on the right side of the cylinder axis and the volumetric capacity of the left portion of the cavity is larger than that of the right portion of the cavity as seen in the cross section viewed from the direction from which the tumble seems to be turning clockwise, shifting of the center of the tumble and weakening of the tumble during the compression stroke are decreased so that a sufficiently strong tumble whose center exists approximately at a central part of the combustion chamber is maintained up to a fuel injection point, allowing satisfactory mixture strification by the collision of the tumble and the fuel spray, as will be later described in detail.

In one aspect of the invention, it is preferable for satisfactory mixture strification if the injector is located in a left-hand peripheral area of the combustion chamber with an end of the spark plug directed obliquely downward to the right as seen in the aforesaid cross section, and the injector is controlled to inject a fuel spray under a specific fuel pressure and at a specific fuel injection point such that the fuel spray and the tumble collide with each other in the cavity from approximately opposite directions in a latter part of each compression stroke and the combustible mixture stays for a prolonged period of time around the spark plug which is located at the central part of the ceiling of the combustion chamber during the stratified charge combustion operation.

In anther aspect of the invention, it is preferable if the left and right portions of the cavity, as seen in top view along the cylinder axis, have approximately the same width in the direction perpendicular to the aforesaid cross section at points equally separated to left and right from the cylinder axis.

In still anther aspect of the invention, it is preferable if the ceiling of the combustion chamber is shaped into a pent-roof form, left and right portions of the top surface of the piston form slopes which are generally parallel to the pent-roof-shaped ceiling of the combustion chamber as seen in the aforesaid cross section, and a gap formed between the ceiling of the combustion chamber and the top surface of the piston at and near a top dead center of the piston serves as a squish area.

In yet anther aspect of the invention, it is preferable if the cavity is formed into a generally elliptical shape elongated to both the left and right sides of the cylinder axis and the upper opening of the cavity extends approximately equally to the left and right sides of the cylinder axis as seen in top view along the cylinder axis.

In a further anther aspect of the invention, it is preferable if the bottom surface of the cavity becomes gradually higher from the left side of the cylinder axis to the right side thereof as seen in the aforesaid cross section. This structure ensures a smooth flow of the tumble from right to left along the bottom surface of the cavity, providing effects of preventing the shifting of the center of the tumble and the weakening of the tumble during the compression stroke.

In a still further anther aspect of the invention, it is preferable if an elevation step is formed on the bottom surface of the cavity in the proximity of the cylinder axis in such a manner that a portion of the bottom surface on the right side of the elevation step is higher than a portion of the bottom surface on the left side of the elevation step and the right portion of the bottom surface is parallel to the left portion as seen in the aforesaid cross section. This structure provides, in addition to the aforementioned effects, such effects that the combustible mixture can easily move upward and stay around the spark plug located at the central part of the ceiling of the combustion chamber for a prolonged period of time because the tumble collides with a portion of the fuel spray slightly higher than the lowest part of the fuel spray.

In a yet further anther aspect of the invention, it is preferable if the lowest point of the bottom surface of the cavity situated in its left portion is located at a position lower than a top ring groove formed in the piston as seen in the aforesaid cross section. This structure ensures that the left portion of the cavity has a sufficient depth for producing satisfactory effects of preventing the weakening of the tumble, for instance.

In anther form of the invention, a direct-injection spark-ignition engine having an intake air system which is so constructed as to produce a tumble in a combustion chamber comprises a spark plug and an injector provided at a central part and a peripheral part of a ceiling of the combustion chamber, respectively, as seen in a cross section viewed from a direction from which the tumble seems to be turning clockwise. In this direct-injection spark-ignition engine, the injector injects fuel into the combustion chamber in a direction opposite to a flow of the tumble to produce a stratified combustible mixture around the spark plug at an ignition point during stratified charge combustion operation, and a cavity whose upper opening is elongated to both the left and right sides of a cylinder axis is formed in the top surface of a piston, the distance between the ceiling of the combustion chamber and a bottom surface of the cavity as measured parallel to the cylinder axis being smaller on the right side of the cylinder axis than on the left side thereof and the bottom surface of the cavity becoming gradually lower from the right side of the cylinder axis to the left side thereof, and a portion of the cavity to the left of the cylinder axis has a larger volumetric capacity than a portion of the cavity to the right of the cylinder axis, as seen in the aforesaid cross section.

In this construction, the injector injects the fuel during a compression stroke in such a manner that a fuel spray and the tumble collide with each other in the cavity from approximately opposite directions during the stratified charge combustion operation. This serves to accelerate atomization of the fuel and produce the stratified combustible mixture around the spark plug located at the central part of the ceiling of the combustion chamber by stratifying a mixture of the fuel spray and air. The collision of the fuel spray with the tumble creates a situation in which the mixture floats beneath the central part of the ceiling of the combustion chamber. As a result, compared to the aforementioned prior art arrangement of Japanese Unexamined Patent Publication No. 2000-120440 in which the mixture is simply transported by the tumble, the period of time during which the combustible mixture stays around the spark plug is extended, resulting in an increase in the degree of freedom in determining fuel injection and ignition timing.

In particular, since the cavity is shaped such that the distance between the ceiling of the combustion chamber and the bottom surface of the cavity as measured parallel to the cylinder axis is smaller on the right side of the cylinder axis than on the left side thereof and the bottom surface of the cavity becomes gradually lower from the right side of the cylinder axis to the left side thereof as seen in the cross section viewed from the direction from which the tumble seems to be turning clockwise, shifting of the center of the tumble and weakening of the tumble during the compression stroke are decreased so that a sufficiently strong tumble whose center exists approximately at a central part of the combustion chamber is maintained up to a fuel injection point, allowing satisfactory mixture strification by the collision of the tumble and the fuel spray, as will be later described in detail. The arrangement of this invention also serves to increase the effect of improving fuel economy by mixture strification.

These and other objects, features and advantages of the invention will become more apparent upon reading the following detailed description in conjunction with the accompanying drawings.

This application is based on Japanese patent application serial no. 2001-99220, filed in Japan Patent Office on Mar. 30, 2001, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A direct-injection spark-ignition engine having an intake air system which is so constructed as to produce a tumble in a combustion chamber whose ceiling is higher at a central part than at a peripheral part as seen in a cross section viewed from a direction from which the tumble seems to be turning clockwise, said engine comprising:

a spark plug;

an injector provided at the central part and the peripheral part of the ceiling, respectively; said injector injects fuel into the combustion chamber in a direction opposite to a flow of the tumble to produce a stratified combustible mixture around the spark plug at an ignition point during stratified charge combustion operation; and a piston formed with a cavity on the top surface of thereof, said cavity is in a form of an upper opening being elongated to both the left and right sides of a cylinder axis the a distance between the ceiling of the combustion chamber and a bottom surface of the cavity as measured parallel to the cylinder axis being smaller on the right side of the cylinder axis than on the left side of the cylinder axis and largest at least at a point where the cylinder axis crosses the bottom surface of the cavity, a portion of the cavity to the left of the cylinder axis has a larger volumetric capacity than a portion of the cavity to the right of the cylinder axis, as seen in said cross section; and the upper opening of the cavity extends approximately equally to the left and right sides of the cylinder axis as soon in top view along the cylinder axis.

2. The direct-injection spark-ignition engine according to claim 1, wherein the injector is located in a left-hand peripheral area of the combustion chamber with an end of the spark plug directed obliquely downward to the right as seen in said cross section, and the injector is controlled to inject a fuel spray under a specific fuel pressure and at a specific fuel injection point such that the fuel spray and the tumble collide with each other in the cavity from approximately opposite directions in a latter part of each compression stroke and the combustible mixture stays for a prolonged period of time around the spark plug which is located at the central part of the ceiling of the combustion chamber during the stratified charge combustion operation.

3. The direct-injection spark-ignition engine according to claim 1, wherein the left and right portions of the cavity, as seen in top view along the cylinder axis, have approximately the same width in the direction perpendicular to said cross section at points equally separated to left and right from the cylinder axis.

4. The direct-injection spark-ignition engine according to claim 1, wherein the ceiling of the combustion chamber is shaped into a pent-roof form, left and right portions of the top surface of the piston form slopes which are generally parallel to the pent-roof-shaped ceiling of the combustion chamber as seen in said cross section, and a gap formed between the ceiling of the combustion chamber and the top surface of the piston at and near a top dead center of the piston serves as a squish area.

5. The direct-injection spark-ignition engine according to claim 1, wherein the cavity is formed into a generally elliptical shape elongated to both the left and right sides of the cylinder axis and the upper opening of the cavity extends approximately equally to the left and right sides of the cylinder axis as seen in top view along the cylinder axis.

6. The direct-injection spark-ignition engine according to claim 1, wherein the bottom surface of the cavity becomes gradually higher from the left side of the cylinder axis to the right side thereof as seen in said cross section.

7. The direct-injection spark-ignition engine according to claim 1, wherein an elevation step is formed on the bottom surface of the cavity in the proximity of the cylinder axis in such a manner that a portion of the bottom surface on the right side of the elevation step is higher than a portion of the bottom surface on the left side of the elevation step and the right portion of the bottom surface is parallel to the left portion as seen in said cross section.

8. The direct-injection spark-ignition engine according to claim 1, wherein the lowest point of the bottom surface of the cavity situated in its left portion is located at a position lower than a top ring groove formed in the piston as seen in said cross section.

9. A direct-injection spark-ignition engine having an intake air system which is so constructed as to produce a tumble in a combustion chamber, said engine comprising:

a spark plug;

an injector provided at a central part and a peripheral part of a ceiling of the combustion chamber, respectively, as seen in a cross section viewed from a direction from which the tumble seems to be turning clockwise; and the injector injects fuel into the combustion chamber in a direction opposite to a flow of the tumble to produce a stratified combustible mixture around the spark plug at an ignition point during stratified charge combustion operation; and a piston formed with a cavity on the top surface thereof, said cavity is in a form of an upper opening being elongated to both the left and right sides of a cylinder axis, a distance between the ceiling of the combustion chamber and a bottom surface of the cavity as measured parallel to the cylinder axis being smaller on the right side of the cylinder axis than on the left side thereof and the bottom surface of the cavity becoming gradually lower from the right side of the cylinder axis to the left side thereof, and a portion of the cavity to the left of the cylinder axis has a larger volumetric capacity than a portion of the cavity to the right of the cylinder axis, as seen in said cross section.

\* \* \* \* \*